US008027664B2

(12) United States Patent
Wang

(10) Patent No.: US 8,027,664 B2
(45) Date of Patent: Sep. 27, 2011

(54) MEDIA DISTRIBUTION METHOD FOR MOBILE COMMUNICATION DEVICE

(76) Inventor: Kevin Peichih Wang, Alhambra, CA (US)

( * ) Notice: Subject to any disclaimer, the term of this patent is extended or adjusted under 35 U.S.C. 154(b) by 995 days.

(21) Appl. No.: 11/982,530

(22) Filed: Nov. 1, 2007

(65) Prior Publication Data

US 2008/0102792 A1 May 1, 2008

(51) Int. Cl.
*H04M 1/66* (2006.01)
(52) U.S. Cl. .................................... 455/410; 455/412.1
(58) Field of Classification Search .................. 455/410, 455/412.1
See application file for complete search history.

(56) References Cited

U.S. PATENT DOCUMENTS

2002/0078439 A1 * 6/2002 Yamaga ........................... 725/1
2007/0112676 A1 * 5/2007 Kontio et al. ................... 705/50
2008/0153540 A1 * 6/2008 Brown ........................ 455/550.1
2010/0017468 A1 * 1/2010 Forstadius .................... 709/203
* cited by examiner

*Primary Examiner* — Barry W Taylor
(74) *Attorney, Agent, or Firm* — Raymond Y. Chan; David and Raymond Patent Firm

(57) ABSTRACT

A media distribution system includes a service provider and at least a mobile terminal. The service provider includes at least two district servers which communicate with each other through Internet. The mobile terminal is communicatively linked to at least one of the district servers for wirelessly communicating with a mobile phone of a registered user through a mobile telecommunication network, wherein the service provider forms a communication link for allowing the registered user to obtain a media information from the district server through Internet via the mobile phone of the registered user, wherein the mobile terminal obtains the media information from the district server and transmits the media information to the mobile phone of the registered user through the mobile telecommunication network so as to distribute the media information via the mobile phone of the registered user.

14 Claims, 2 Drawing Sheets

MEDIA DISTRIBUTION METHOD FOR MOBILE COMMUNICATION DEVICE

BACKGROUND OF THE PRESENT INVENTION

1. Field of Invention

The present invention relates to a media distribution system, and more particularly to a media distribution system and a method thereof for mobile communication device, wherein media information can be securely exchanged between a mobile phone and a service provider primarily through a telecommunication network.

2. Description of Related Arts

Sending short messages through telecommunication network has become a normal practice for cellular phone users. In some occasions, sending short messages is a convenient way of exchanging information between two parties in that they do not need to make an actual phone call, thus saving the hassles of dialing numbers, waiting for reply and leaving voice messages when the other party does not answer that phone call. Moreover, when one party wishes to transmit the same message to a plurality of recipients through a telecommunication network, it is perhaps not wise for him to make separate phone calls to each individual recipient. Sending short messages would be his best possible option. As a matter of conventional arts, however, sending messages through telecommunication networks are usually limited to short and simple text messages, presumably because no one has thought of receiving more complicated or confidential information through the telecommunication.

As a result, when people wish to acquire more sophisticated or confidential information when they are traveling (i.e. in outdoor environment), they usually utilize laptop computers rather than mobile phones. A reason for this particular social practice may be that it is more convenient and secure to handle sophisticated information by computers.

While this attitude is understandable, those skilled in the arts have largely ignored a big disadvantage in relation this social practice. In particular, while information technology employed in laptop computers are drastically advancing, no one notices a key issue in relation to outdoor receipt and transmission of information—that laptop computers, though small when compared with their desktop counterparts, are nevertheless bulky and heavy to carry.

There are several relatively minor disadvantages too. First, laptop computers are usually expensive (or at least more expensive than mobile phones) so that they are easy to become a target of thefts. Consequently, users who bring their laptop computers with them while traveling have to pay extra attention to their laptop computers. This can cause great inconvenience to the users of laptop computers. Imagine a familiar situation: when one is traveling alone on a train with his laptop computer, and if he needs to go to restroom, he will have to find a secure place to store his laptop computer or to ask a reliable person to keep it for him temporarily.

Second, laptop computers are usually sophisticated instruments designed for accomplishing complicated tasks which involve more than wirelessly transmitting or receiving information, even information of a sophisticated nature. As a result, when users carry with them wherever they go, their laptop computers have a higher risk of being damaged by other objects or accidentally strong vibration. Here, the bad thing about laptop computers is that they are generally expensive to repair when broken down.

Third, it is easily conceivable that those users who bring their laptop computer for acquiring or sending information while traveling may also wish to carry their mobile phones. This obviously imparts great inconvenience to such users. Moreover, the laptop computers and the mobile phone usually utilize two different kinds of communication networks respectively, the user have to spend a considerable amount of money for separately subscribing the use of these two communication networks.

Fourth, there exist certain occasions where launching a laptop computer is undesirable or physically infeasible. For example, a user may feel very troublesome to launch a laptop computer (which usually takes three to five minutes) when what he wants to do is just to receive and watch a short video clip. The same feeling may also emerge when the user is in a compact area, such as in a restroom.

SUMMARY OF THE PRESENT INVENTION

A main object of the present invention is to provide a media distribution system comprising a service provider adapted for communicatively linked with another service provider through Internet, and a mobile terminal adapted for linking between the service provider and a mobile phone, so as to facilitate information exchange between the mobile phone and the service provider.

Another object of the present invention is to provide a media distribution system which allows a mobile phone user to obtain and transmit media information, such as a short video clip, from a predetermined service provider through a telecommunication network. In other words, the user does not need to use any laptop computers for getting media information.

Another object of the present invention is to provide a media distribution system wherein the mobile phone user may obtain media information from Internet through Internet access by the service provider. In other words, the user is able to get Internet information solely through a telecommunication network. There is no need for the user to separately subscribe separate services of a telecommunication network and Internet connection.

Another object of the present invention is to provide a media distribution system which assigns a predetermined security code for a user to transmit and receive media information by the user's mobile phone so as to prevent the media information being transmitted to unauthorized persons.

Another object of the present invention is to provide a media distribution system and a method thereof for allowing a user to exchange information between his or her mobile phone and a service provider.

Accordingly, in order to accomplish the above objects, the present invention provides a media distribution system, comprising:

a service provider which comprises at least two district servers which communicate with each other through Internet; and at least a mobile terminal communicatively linked to at least one of the district servers for wirelessly communicating with a mobile phone of a registered user through a mobile telecommunication network, wherein the service provider forms a communication link for allowing the registered user to obtain a media information from the district server through Internet via the mobile phone of the registered user, wherein the mobile terminal obtains the media information from the district server and transmits the media information to the mobile phone of the registered user through the mobile telecommunication network so as to distribute the media information via the mobile phone of the registered user.

Moreover, the present invention provides a method of distributing media information, comprising the steps of:

(a) communicatively linking at least two district servers through Internet;

(b) communicatively linking a mobile terminal with at least one of the district servers, wherein the mobile terminal is wirelessly communicated with a mobile phone of a registered user through a mobile telecommunication network; and (c) allowing the registered user to obtain a media information from the district server through Internet via the mobile phone of the registered user, wherein the mobile terminal obtains the media information from the district server and transmits the media information to the mobile phone of the registered user through the mobile telecommunication network so as to distribute the media information via the mobile phone of the registered user.

These and other objectives, features, and advantages of the present invention will become apparent from the following detailed description, the accompanying drawings, and the appended claims.

DETAILED DESCRIPTION OF THE PREFERRED EMBODIMENT

Figure 1:
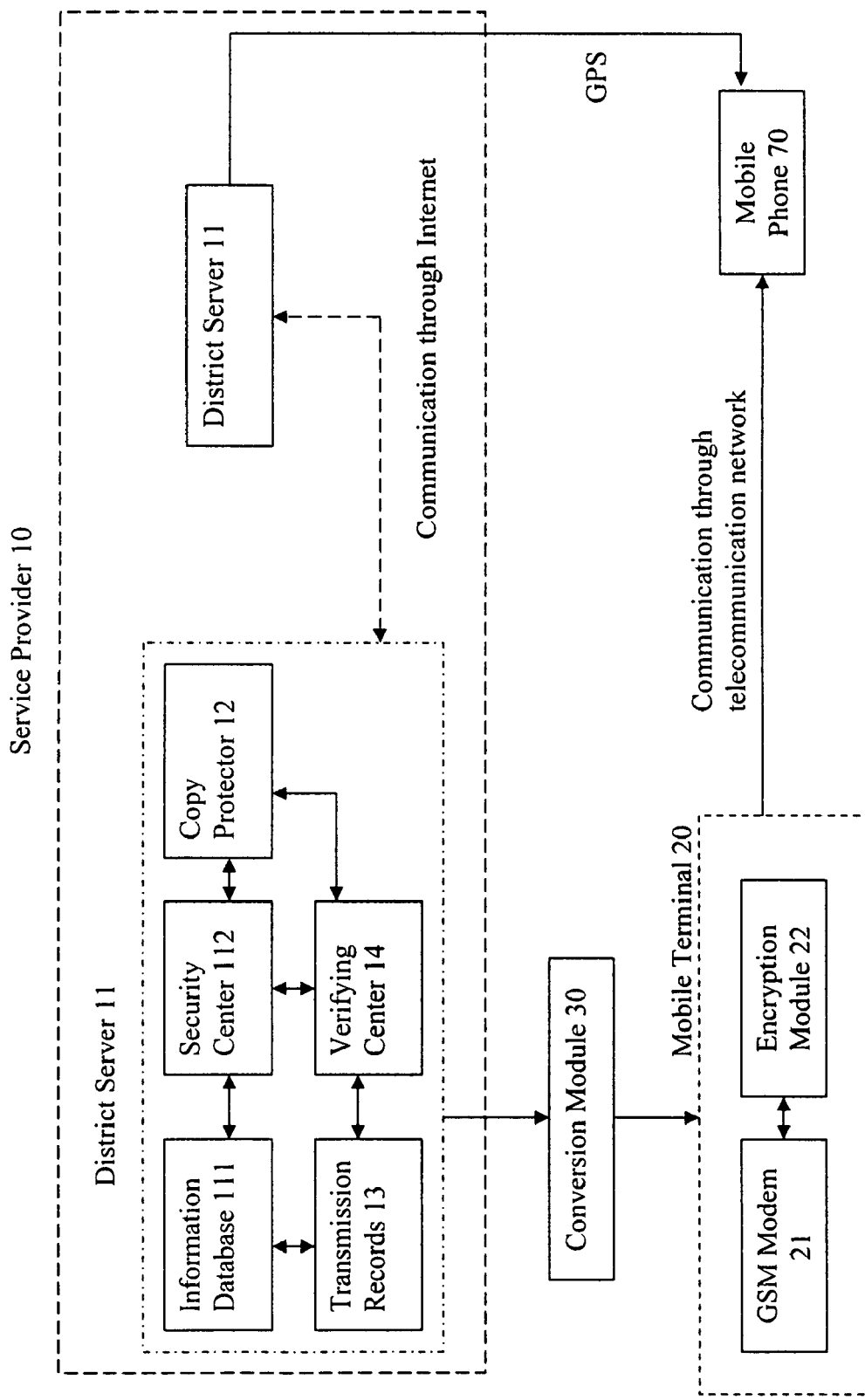
FIG. 1 is a schematic diagram of a media distribution system according to a preferred embodiment of the present invention.

Referring to FIG. 1 of the drawings, a media distribution system according to a preferred embodiment of the present invention is illustrated, in which the media distribution system comprises a service provider 10 and at least a mobile terminal 20.

The service provider 10 comprises at least two district servers 11 which communicate with each other through Internet. The mobile terminal 20 is communicatively linked to at least one of the district servers 11 for wirelessly and bi-directionally communicating with a mobile phone 70 of a registered user through a mobile telecommunication network, wherein the district server 11 forms a communication link for allowing the registered user to obtain media information from the district server 11 through Internet via the mobile phone 70 of the registered user, wherein the mobile terminal 20 obtains the media information from the district server 11 and transmits the media information to the mobile phone 70 of the registered user through the mobile telecommunication network so as to distribute the media information via the mobile phone 70 of the registered user. The communication protocols between the district servers 11 and the mobile phone 70 is preferably compatible with a wide variety of existing information systems, such as MSN, MMS, QQ etc.

According to the preferred embodiment of the present invention, each of the district servers 11 comprises an information database 111 adapted for storing the media information and customer accounts (such as a user info of a registered user), wherein the information database 111 of each of the district servers 11 is communicatively linked with the other district server 11 through Internet so as to share information between the two district servers 11 and to allow the registered user to retrieve the media information from Internet through the mobile terminal 20. The district servers 11 are not limited to be located in one single country, rather, they can be located in different countries, wherein the communication between them can be through Internet or designated telecommunication network.

Each of the district servers 11 further comprises a security center 112 communicatively linked with the respective information database 111 and the mobile terminal 20, wherein the security center 112 is adapted for generating a security access code for each of the registered users of the present invention as a priority configuration for the corresponding registered users, and verifying an identity of the user seeking to access information from the information database 111 by his mobile phone 70 through the telecommunication network.

Each of the district servers 11 comprises a verifying center 14 not only verifying an identity of the mobile phone 70 of the registered user but also confirming the mobile phone 70 of the registered user being able to retrieve the media information.

Consequently, the user of the present invention is required to register with the service provider 10 for being assigned with a personal security access code for transmitting to and receiving media information from the respective district server 11.

It is worth mentioning that the media information transmitted by the media distribution system can be in the form of a wide variety of media information, such as short video clips, pictures, photos, text messages, maps, Mid/Polyphonic ring tones. MP3 ring tones, wallpapers, games etc. The user is able to get the desired information, as searched from Internet, by his or her mobile phone 70 through a predetermined telecommunication network. Moreover, the user is also able to provide certain information to the district servers 11 via the mobile phone 70 so as to accomplish bi-directional information exchange between the mobile phone 70 and the district servers 11. For example, the user is able to upload some information to the designated district servers 11. It is worth mentioning that the information uploaded is adapted to be stored in designated address or account of the corresponding district server 11 which could only be accessed and retrieved by others upon user's authorization in the form of a wide variety of security access methods, such as designated password. In other words, the user is able to exercise file sharing with other designated personnel. The accessible files should be tagged and any relevant index could be stored on the corresponding district server 11 and the mobile phone 70 as well. The files could be retrieved whenever necessary.

The mobile terminal 20 comprises a GSM (Global System for Mobile Communications) modem 21 communicatively linking between the user's mobile phone 70 with the respective district server 11 by using a predetermined standard MMS (Multimedia Messaging Service) protocols. In order to ensure that the media information can be wirelessly communicated between the user's mobile phone 70 and the respective district server 11, the mobile terminal 20 further comprises an encryption module 22 linked with the GSM modem 21 and the respective district server 11 in such a manner that the media information is first encrypted by the encryption module 22 before being sent out by the GSM modem 21 so as to prevent unauthorized interference of the media information. As a result, the mobile phone 70 comprises an information de-encryption device for compiling the encrypted media information transmitted from the mobile terminal 20.

Therefore, the media distribution system further comprises at least one conversion module 30 communicatively linked between the mobile terminal 20 and the respective district server 10 for converting the media information from a first predetermined electronic format to a second predetermined electronic format or vice versa, wherein each of the first and the second electronics format is a standard data format for information processing.

It is important to point out that one of the peculiar features of the present invention is that the service provider 10 further comprises a copy protector 12 communicatively linked to the respective district server 11, wherein the copy protector 12 is loaded with predetermined software for stopping unauthorized copying by other people so that the user can be ensured that the media information he receives by his mobile phone 70 via the telecommunication network is copy-protected. In other words, the user himself cannot copy the media information without authorization. Thus, the copy protector 12 guards the media information when the media information is sent to the mobile phone 70 of the registered user for stopping unauthorized copying of the media information so as to stop the media information to be sent out by the mobile phone 70.

In order to keep track of the information transmission history, the service provider 10 further comprises a transmission record 13 containing a history of the media information has been transmitted from the service provider 10 to the mobile phone 70 of the registered user.

The operation of the present invention is as follows: first, the user needs to create an account with the service provider 10 and request the types of media information he wishes to obtain through Internet. During the registration process, the user needs to provide the service provider 10 with a mobile phone 70 number for accessing the media information and the user is assigned a security access code. The service provider 10 will then send a short message to the provided mobile phone number prompting for the security access code. The user then needs to enter the security access code and send the message back to the service provider 10. When the security access code is verified, the service provider 10 will then send the required media information (the copyright of which has been verified by the copyright verifier 12) to the user's mobile phone 70 via the telecommunication network. Note that the required media information may be obtained from the any district servers 11 via Internet. In the words, the user may get media information from Internet solely through a telecommunication network.

Note that media distribution system of the present invention may utilize Global Positioning System (GPS) for assisting its operation. Accordingly, the media distribution system can further comprise global positioning system communicatively linked with the mobile phone 70 and the district servers 11 so as to allow at least one of the district servers 11 to locate the position of the mobile phone 70.

Figure 2:
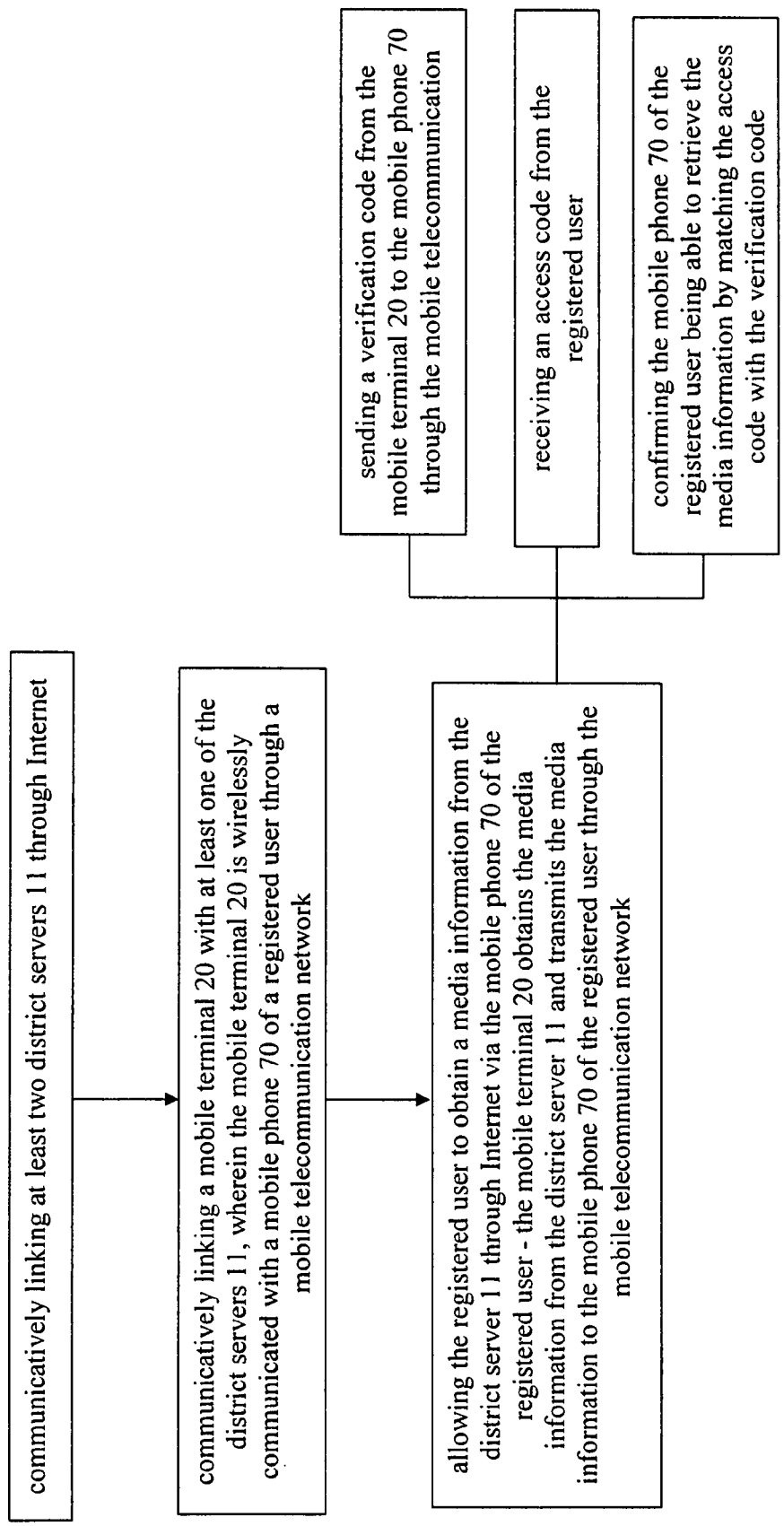
FIG. 2 is a method of distributing media information by the media distribution system according to the above preferred embodiment of the present invention.

Referring to FIG. 2 of the drawings, a method of distributing media information using the media distribution system according to the preferred embodiment of the present invention is illustrated, in which the method comprises the steps of:

(a) communicatively linking at least two district servers 11 through Internet;

(b) communicatively linking a mobile terminal 20 with at least one of the district servers 11, wherein the mobile terminal 20 is wirelessly communicated with a mobile phone 70 of a registered user through a mobile telecommunication network; and (c) allowing the registered user to obtain a media information from the district server 11 through Internet via the mobile phone 70 of the registered user, wherein the mobile terminal 20 obtains the media information from the district server 11 and transmits the media information to the mobile phone 70 of the registered user through the mobile telecommunication network so as to distribute the media information via the mobile phone 70 of the registered user.

According to the preferred embodiment of the present invention, the method further comprises the steps, before step (c), of:

(c.1) sending a verification code from the mobile terminal 20 to the mobile phone 70 through the mobile telecommunication network to verify an identity of the mobile phone 70 of the registered user;

(c.2) receiving an access code from the registered user; and (c.3) confirming the mobile phone 70 of the registered user being able to retrieve the media information by matching the access code with the verification code.

Step (c) further comprises a step of converting the media information into a predetermined format that allows the media information to be transmitted not only between the mobile terminal 20 and the mobile phone 70 through the mobile telecommunication network but also between the district servers 111 through Internet.

Moreover, step (c) further comprises a step of blocking unauthorized copying of the media information so as to stop the media information to be sent out by the mobile phone 70, and a step of generating a history of the media information which has been transmitted from the service provider 10 to the mobile phone 70 of the registered user.

It is worth mentioning that the registered user is registered to the district server 11 by the steps of creating a user account for the registered user in the district server 11, and confirming a mobile phone number of the registered user with the district server 11 for the registered user to access media information by the corresponding mobile phone 70.

Moreover, the communication between the district servers 11 should not be limited in the same country; however, the related laws and regulations in involved countries should not be violated.

The communication between the district servers 11 and the terminal device, such as the mobile phone 70 should also have the following distinctive features.

A bidirectional communication capacity. The terminal devices and the district server 11 should be able to upload and download the data from each other. The servers should have a certain priority configuration to provide security of personal information and therefore preventing identity theft.

The terminal devices in different countries should be able to communicate with each other when necessary. The service would be provided through the connection between district servers (or server pools).

The communication protocols between the district server 11 and the terminal device should be compatible with the commonly used ones such as the MMS, MSN messenger, QQ, etc.

The multimedia files should be able to upload onto the district servers 11 and store in the designate space for the users. The user could have the right to decide whom (the other users) could have the privilege to access the files. (File sharing)

The accessible files should be "tagged" and the index could be stored on the district servers 11 and the terminal devices as well. Therefore the files could be reproduced when needed. (Bookmark)

The service would be divided into the free and subscription parts. The subscribers would have the service with full features while the free service will have some limited functions. (Free and Paid Service)

The long distance calls will be a paid service. However, for users' convenience, this service would be in the format similar to the phone card. The transaction could be done through the district servers 11. (Online transaction)

The users should be able to access the account in different countries through the communication with the district server 11.

The mapping service: the device should be able to provide detailed driving direction from the start point to the destination through the GPS, the mapquest and equivalent (such as google map or yahoo map).

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A media distribution system, comprising:

a service provider which comprises at least two district servers which communicate with each other through Internet; and at least a mobile terminal communicatively linked to at least one of said district servers for wirelessly and bi-directionally communicating with a mobile phone of a registered user through a mobile telecommunication network, wherein said service provider forms a communication link for allowing said registered user to obtain a media information from Internet through said mobile telecommunication network, wherein said mobile terminal comprises a GSM modem communicatively linking between said mobile phone with said respective district server by using predetermined standard MMS protocols, so as to transmit said media information between said service provider and said mobile phone through said mobile terminal, such that said mobile terminal obtains said media information from said district server and transmits said media information to said mobile phone of said registered user through said mobile telecommunication network so as to distribute said media information via said mobile phone of said registered user, wherein each of said district servers comprises a verifying center not only verifying an identity of said mobile phone of said registered user but also confirming said mobile phone of said registered user being able to retrieve said media information, wherein said verifying center sends out a message with a security access code to said mobile phone of said registered user for identifying said mobile phone of said registered user and receives said message with said security access code back from said mobile phone of said registered user for confirming said mobile phone of said registered user, wherein said security access code is verified, said media information is then sent to said mobile phone of said registered user through said mobile telecommunication network by MMS protocols.

2. The media distribution system, as recited in claim 1, wherein each of said district servers further comprises an information database storing said media information and a user info of said registered user, wherein said information database of said district servers are communicatively linked with each other through Internet so as to allow said registered user to retrieve said media information from Internet through said mobile terminal.

3. The media distribution system, as recited in claim 2, wherein said service provider further comprises a copy protector communicatively linked to said respective district server, wherein said copy protector guards said media information when said media information is sent to said mobile phone of said registered user for stopping unauthorized copying of said media information so as to stop said media information to be sent out by said mobile phone.

4. The media distribution system, as recited in claim 3, wherein said service provider further comprises a transmission record containing a history of said media information has been transmitted from said service provider to said mobile phone of said registered user.

5. The media distribution system, as recited in claim 4, further comprising a global positioning system communicatively linking said mobile phone with at least one of said district servers so as to allow said corresponding district server to keep track of a geographical location of said mobile phone.

6. The media distribution system, as recited in claim 1, wherein said service provider further comprises a copy protector communicatively linked to said respective district server, wherein said copy protector guards said media information when said media information is sent to said mobile phone of said registered user for stopping unauthorized copying of said media information so as to stop said media information to be sent out by said mobile phone.

7. The media distribution system, as recited in claim 3, wherein said service provider further comprises a transmission record containing a history of said media information has been transmitted from said service provider to said mobile phone of said registered user.

8. The media distribution system, as recited in claim 7, further comprising a global positioning system communicatively linking said mobile phone with at least one of said district servers so as to allow said corresponding district server to keep track of a geographical location of said mobile phone.

9. A method of distributing media information, comprising the steps of:

(a) communicatively linking at least two district servers through Internet;

(b) communicatively linking a mobile terminal with at least one of said district servers, wherein said mobile terminal is wirelessly and bi-directionally communicated with a mobile phone of a registered user through a mobile telecommunication network, wherein said mobile terminal comprises a GSM modem communicatively linking between said mobile phone with said respective district server by using predetermined standard MMS protocols, so as to transmit said media information between said service provider and said mobile phone through said mobile terminal,; and (c) allowing said registered user to obtain a media information from Internet via said mobile phone of said registered user through said mobile telecommunication network, wherein said mobile terminal obtains said media information from said district server and transmits said media information to said mobile phone of said registered user through said mobile telecommunication network so as to distribute said media information via said mobile phone of said registered user, wherein said media information is verified before being sent to said mobile phone of said registered user by the steps of:

sending a message with a security access code from said mobile terminal to said mobile phone of said registered user to identify said mobile phone of said registered user;

receiving said message with said security access code back from said mobile phone of said registered user for confirming said mobile phone of said registered user; and confirming said mobile phone of said registered user being able to retrieve said media information by matching said security code, such that said media information is then sent to said mobile phone of said registered user through said mobile telecommunication network by MMS protocols.

10. The method, as recited in claim 9, wherein said step (c) further comprises a step of converting said media information into a predetermined format that allows said media information to be transmitted not only between said mobile terminal and said mobile phone through said mobile telecommunication network but also between said district servers through Internet.

11. The method, as recited in claim 10, wherein said step (c) further comprises a step of blocking unauthorized copying of said media information so as to stop said media information to be sent out by said mobile phone.

12. The method as recited in claim 11, before the step (c), further comprising a step of generating a history of said media information has been transmitted from said service provider to said mobile phone of said registered user.

13. The method, as recited in claim 12, wherein said registered user is registered to said district server by the steps of: creating a user account for said registered user in said district server; and confirming a mobile phone number of said registered user with said district server for said registered user to access media information by said corresponding mobile phone.

14. The method, as recited in claim 12, in said step (b), said mobile phone and said at least one of said district servers are communicatively linked by a global positioning system so that said corresponding district server is adapted to keep track of a geographical location of said mobile phone.

* * * * *